June 6, 1944.     R. M. HEINTZ     2,350,680
CONTROL SYSTEM
Filed Feb. 18, 1943     3 Sheets-Sheet 1

INVENTOR.
RALPH M. HEINTZ.
BY
ATTORNEY.

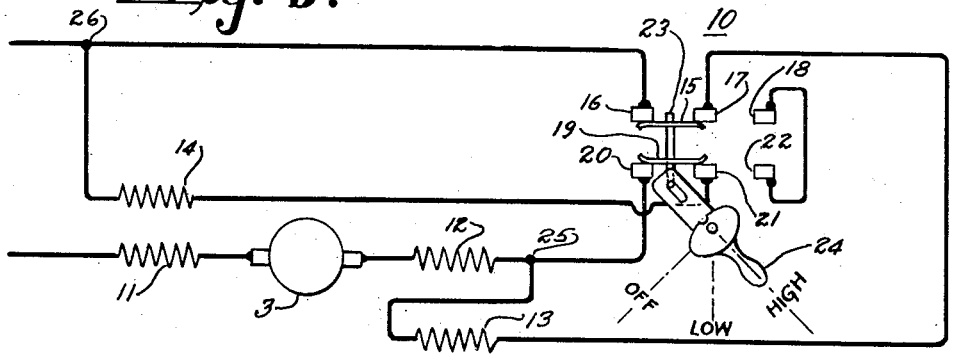
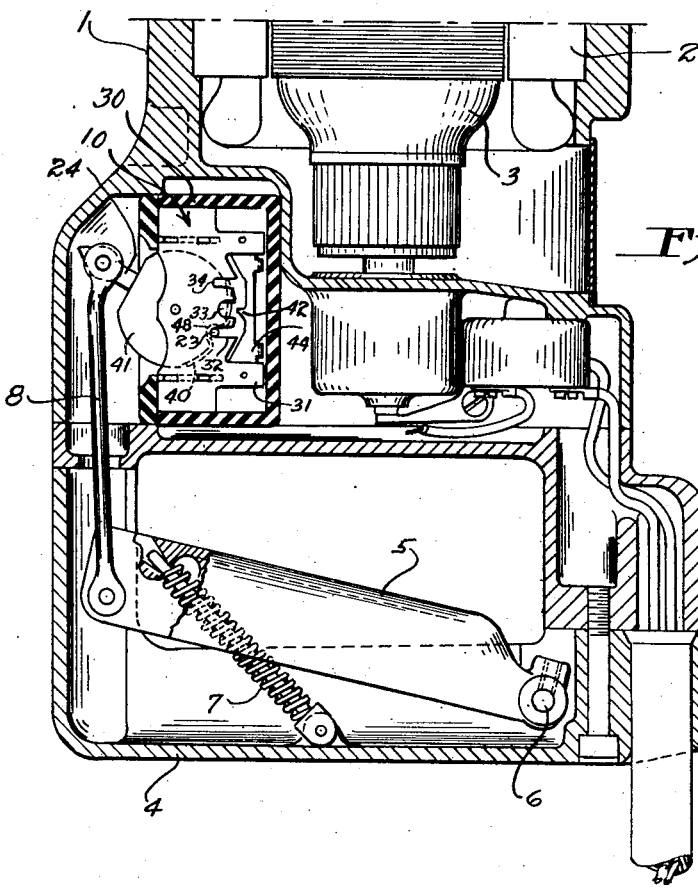

June 6, 1944.     R. M. HEINTZ     2,350,680
CONTROL SYSTEM
Filed Feb. 18, 1943     3 Sheets-Sheet 3
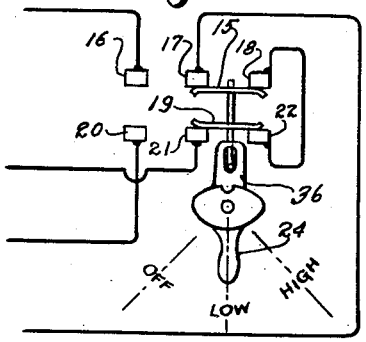
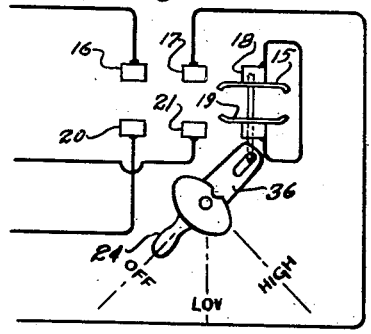
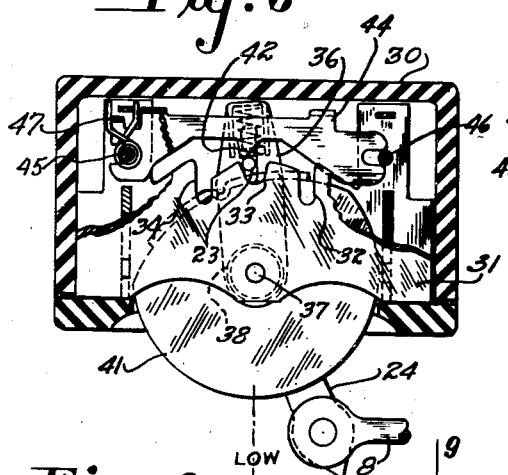
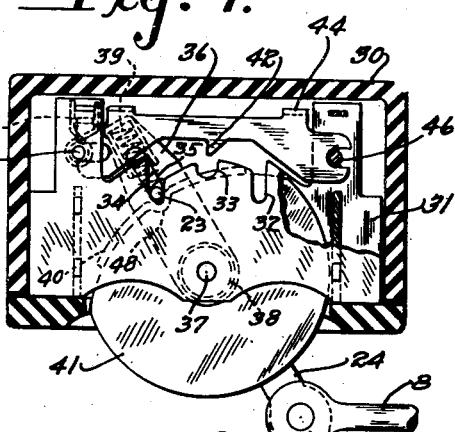
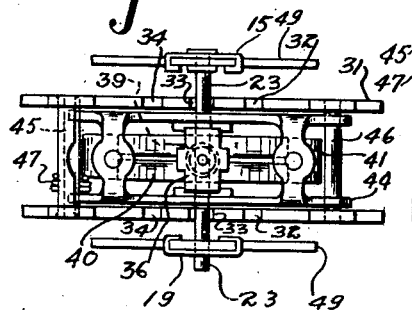
INVENTOR.
RALPH M. HEINTZ.
BY
Frank A. Harmon
ATTORNEY.

Patented June 6, 1944

2,350,680

UNITED STATES PATENT OFFICE 2,350,680

CONTROL SYSTEM

Ralph M. Heintz, Cleveland, Ohio, assignor to Jack & Heintz, Inc., Bedford, Ohio, a corporation of Ohio Application February 18, 1943, Serial No. 476,326

4 Claims. (Cl. 172—179)

This invention relates to improvements in energizers for accelerating the flywheels of inertia starters for aircraft.

On different types of aircraft the external hand crank connection is variously located, often in positions making the application of the energizer thereto an awkward operation. It may also be observed that the direction of rotation of the hand crank mechanism is right handed on some engines and left handed on others. These and other considerations render it desirable to initiate the acceleration of the inertia starter flywheel under reduced torque output to give the operator an opportunity to determine the direction of rotation and to brace himself against the torque reaction on the energizer. After operation for a few seconds under reduced torque the operator can effectively throw his weight against said reaction and be prepared for the application of the full torque output of the energizer to accelerate the flywheel at a more rapid rate.

It is accordingly the object of the present invention to provide a system under the control of the operator for selective low and high torque operation of an energizer of the type described. A particular object is to provide an energizer motor having variable field circuit connections arranged for manual switching to produce sequential low and high torque energization of the mechanical inertia starting mechanism. Another object is to provide an energizer control system for establishing low torque operation by a first movement of a manipulable member to a limit of its movement, and for establishing high torque operation by a second movement of said member to a second limit of movement, said second limit being unavailable in said first movement.

A preferred embodiment of the invention is illustrated in the accompanying drawings in which:

Figure 2 is a longitudinal sectional view through the handle end of the present energizer showing the manual control mechanism;

Figure 3 is a schematic wiring diagram of the electrical system for producing high and low torque outputs from the energizer, showing the switch in high torque position;

Figure 4 is a diagram of the electrical connections established by the switch in low torque position;

Figure 5 is a diagram of the switch in off position;

Figure 6 is a sectional view of the mechanical structure of the switch, showing the same in low torque position;

Figure 7 shows the switch in high torque position;

Figure 8 shows the switch parts in position for changing from low torque position to high torque position;

Figure 9 is a top view of the switch mechanism shown in Figures 6 to 8; and

Figure 1:
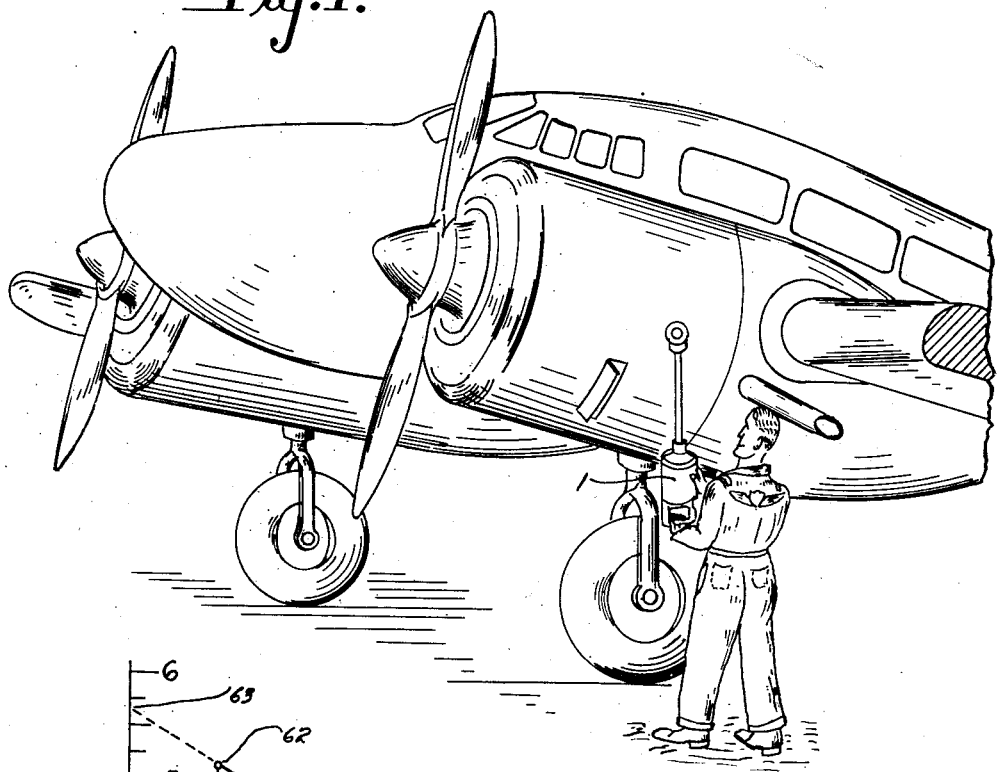
Figure 1 shows an operator applying an energizer to a starting mechanism on an airplane engine.

Figure 1 shows an operator applying an energizer 1 to a starting mechanism on an airplane engine. Sometimes this operation can be carried out from the ground as shown without especial inconvenience, but it often happens that the energizer connection on the starting mechanism is very inconveniently located, sometimes requiring the operator to crawl under the aircraft, or to stand on the edge of a wing or to assume some other awkward position. In such difficult situations the task of the operator is made much easier if he has some control over the torque output so that he can get the feel of the reaction on the energizer and brace himself accordingly before turning on the full torque output of an energizer designed to start the largest aircraft engines.

As shown in Figure 2, the energizer 1 is powered by a motor having a field structure 2 and armature 3. On the end of the motor housing is a handle 4 having a grip member 5 pivoted at 6 and biased to the position shown by means of a spring 7. A link 8 connected with the grip member 5 operates a switch 10 for controlling the motor, the switch being normally held in its off position, as shown, by the spring 7.

Referring now to Figure 3, it is seen that the circuits for the field structure 2 include a pair of distributed windings 11 and 12 permanently connected in series with the armature 3, and a pair of additional distributed windings 13 and 14 in series with the windings 11 and 12 and connectible in either series or parallel with each other by means of switch 10. When the windings 13 and 14 are connected in parallel with each other, as in Figure 3, high torque is developed by the motor. In this position of the switch 10, shown diagrammatically in Figure 3, a sliding jumper 15 bridges stationary contacts 16 and 17, and a sliding jumper 19 bridges stationary contacts 20 and 21; whereby the current through armature 3 and coils 11 and 12 divides at junction 25, one circuit including coil 13, contact 17, jumper 15, and contact 16 to junction 26, and the other circuit including contact 20, jumper 19, contact 21, and coil 14 to junction 26. The sliding jumpers 15 and 19 are insulated from each other and are moved in unison by a pin 23 under the control of lever 24.

In the low torque position of the switch, shown in Figure 4, the jumpers 15 and 19 bridge contacts 17 and 18, and 21 and 22, respectively, connecting the coils 13 and 14 in series with each other and with the coils 11 and 12 and armature 3. In this case the path of the circuit proceeds from junction 25 through coil 13, contact 17, jumper 15, contact 18, contact 22, jumper 19, contact 21, and coil 14 to junction 26.

In the off position of the switch, shown in Figure 5, the jumpers 15 and 19 have left the live contacts and are resting on the now dead contacts 18 and 22, leaving the circuit open.

The mechanical action of the switch 10 is designed to positively prevent initial high torque operation of the motor, means being provided to interpose a temporary stop in the path of movement of the parts when they have been moved to the low position so that they cannot be moved uninterruptedly through the low position into the high position. This mechanical action will now be described with particular reference to Figures 2, 6, 7, 8 and 9.

The switch mechanism is carried by a frame 31 contained within an insulating housing 30 which also contains the stationary contacts 16—18 and 20—22, and the sliding jumpers 15 and 19. The frame 31 is provided with indexing notches or gates 32, 33 and 34 in which the pin 23 reposes in the off, low and high positions, respectively, to properly position the sliding jumpers 15 and 19 with respect to the fixed contacts. Pin 23 is carried in slots 35 in a yoke 36 having a common pivot 37 with the lever 24. A torsion spring 38 provides a resilient lost motion connection between lever 24 and yoke 36 for transmitting movement of the grip 5 to the pin 23. Movement of yoke 36 and pin 23 is prevented, however, by a spring 39 carried in the outer end of the yoke and urging said pin toward pivot 37 and into the notches 32, 33 or 34, the pin being lifted out of said slots by a cam 40 on an insulating body 41 on the lever 24.

Just above the entrance to notch 33 is a detent 42 on a sliding frame 44 riding on pins 45 and 46 in the frame 31, said frame and detent being normally biased to the right, as shown in Figure 7, by a spring 47, but being movable to the left, as shown in Figure 6, by pin 23. In the off position pin 23 normally rests in the bottom of notch 32 in frame 31, and in the bottom of depression 48 in cam 40, as shown in Figure 2. Upon movement of lever 24 to low position the cam 40 moves under pin 23, camming it up and out of notch 32. As soon as pin 23 clears the upper edge of this notch the spring connection 38 between lever 24 and yoke 36 snaps the yoke and pin 23 to the left, the pin engaging detent 42 and carrying it to the left as far as it will go, as shown in Figure 6, blocking further left hand movement of pin 23 so that it cannot pass beyond notch 33. The sliding jumpers are then in the low position shown in Figure 4.

To clear the mechanism for movement to high position it is necessary to relax the pressure on grip 5 until the cam depression 48 arrives under pin 23, allowing the pin to drop clear of detent 42. The detent will then be moved back to the right by spring 47, clearing the path for further travel of pin 23, as shown in Figure 8. Upon a reapplication of pressure to grip 5 the pin 23 is cammed out of notch 33 behind detent 42 and snapped into notch 34, as in Figure 7, placing the switch parts in the positions shown in Figure 3 for high torque operation of the motor.

Upon release of grip 5 the spring 7 returns the switch parts progressively through low position to off, the detent 42 offering no obstacle to the return movement of pin 23, as will be apparent from Figure 8.

Figure 9 shows a top view of the switch mechanism without the stationary contacts, the sliding jumpers 15 and 19 being mounted upon insulating carriers 49 which are reciprocated by the pin 23. In the schematic diagrams in Figures 3 to 5 most of the above described mechanism has been omitted.

Figure 10:
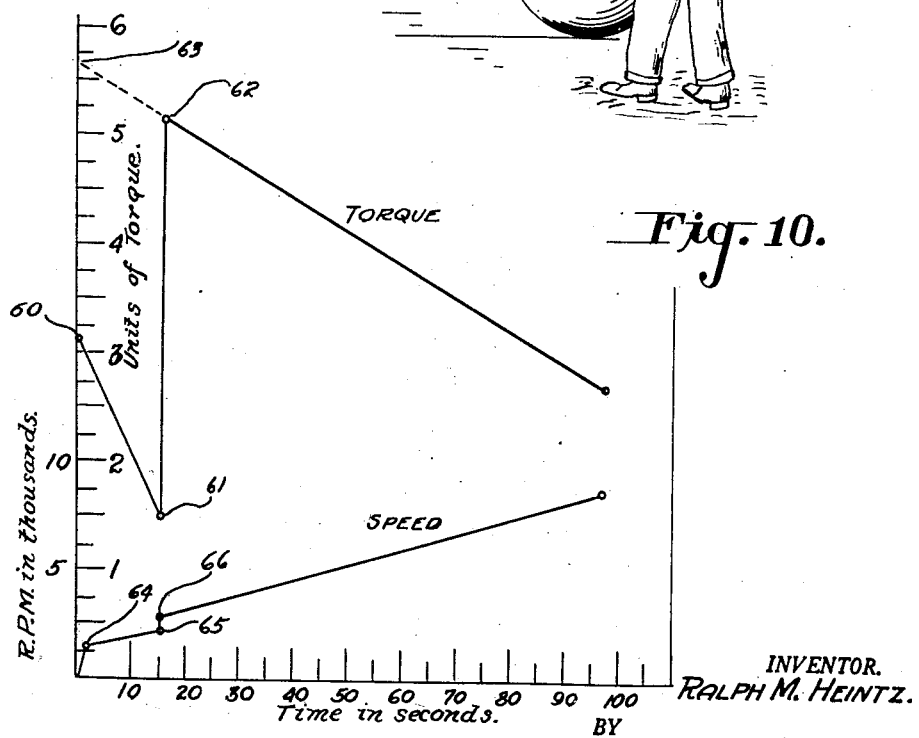
Figure 10 is a graph of speed and torque curves for the present energizer.

In Figure 10 torque and speed have been plotted against time for a typical starting operation, these curves being drawn in ideal form on the basis of an average of a plurality of test runs under actual operating conditions. The value of the initial starting torque is indicated at point 60, operation in the low torque position of the switch continuing to point 61, or for approximately fifteen seconds. When the switch is moved to high torque position the curve jumps to point 62 and then declines steadily as the speed increases. Because of the use of a fluid coupling the motor speed on starting quickly attains a substantial value as indicated by point 64, the speed then steadily increasing to point 65, corresponding to point 61 when the switch is changed. When the high torque circuit is established, at 62, the fluid coupling permits the motor to accelerate to a value indicated by the point 66, after which the speed increase corresponds to the gradual reduction in torque.

It is seen, then, that the initial, or surprise, torque at point 60 is relatively low, giving the operator an opportunity to steady himself if he is standing on an icy wing surface or other precarious footing. When the operator is ready to apply the high torque effort, which may be in less than fifteen seconds, or in more than fifteen seconds, as he chooses, he may momentarily relax pressure on the grip 5 to allow the detent 42 to clear, and then squeeze the grip firmly into high torque position. The maximum torque effort at point 62 is then exerted to accelerate the inertia flywheel quickly to its designed speed.

Another advantage of the invention illustrated in Figure 10 is that the maximum torque value at 62 is less than the value at 63 which would be exerted were it not for applicant's low torque switching arrangement. This advantage may be utilized in either of two ways. If point 63 represents the maximum torque that an operator can handle in a portable energizer, then the difference between the values of 63 and 62 represents a saving of effort on the part of the operator in holding the energizer. However, with the trend toward larger and larger aircraft engines, the motor may be made more powerful so that point 62 instead of 63 represents the maximum torque that an operator can hold, it being remembered that point 63 can never be attained with applicant's switching arrangement. The switching arrangement insures that at least the peak 63 of the torque curve will be removed, it being within the operator's power to delay the switch to high torque as long as he sees fit. Additional objects and advantages will occur to those skilled in the art.

Various changes and modifications may be made, particularly in the specific switching mechanism for carrying out the described functions. All such variations are included in the invention, the same being limited only by the prior art and the scope of the appended claims.

I claim:

1. In an energizer for an aircraft inertia starter, a motor, a first set of field windings in said motor, a second set of field windings, switching means for connecting the windings of said second set in series with each other and with said first set for low torque starting of said motor, said switching means being operable to connect the windings of said second set in parallel with each other and in series with said first set for high torque operation of said motor and means operable by establishment of said series connection to temporarily block the establishment of said parallel connection.

2. In an energizer for aircraft inertia starters, a motor, a low torque circuit for starting said motor, a high torque circuit for operating said motor, a movable handle grip normally biased to an off position, switching means operable by movement of said grip to establish said low torque circuit, stop means to prevent further movement of said grip, and means operable by a slight reverse movement of said grip to render said stop means ineffective and enable said further movement, said switching means being operable by said further movement to establish said high torque circuit, whereby said motor cannot be started on said high torque circuit.

3. In an energizer for aircraft inertia starters, a motor, a low torque circuit for starting said motor, a high torque circuit for operating said motor, a movable handle grip normally biased to an off position, stop means actuated by movement of said grip to stop said movement in an intermediate position, switching means operable by said movement to said intermediate position to establish said low torque circuit, and means operable by a slight reverse movement of said grip to render said stop means ineffective and enable further movement of said grip to a limiting position, said switching means being operable by said further movement to establish said high torque circuit, said grip being free at all times for reverse movement to said off position without interference by said stop means.

4. In an energizer for an aircraft inertia starter, a motor, a first set of distributed field windings in said motor, a second set of distributed field windings, switching means for connecting the windings of said second set in series with each other and with said first set for low torque starting of said motor, said switching means being operable to connect the windings of said second set in parallel with each other and in series with said first set for high torque operation of said motor, a movable handle grip normally biased to an off position, stop means actuated by movement of said grip to stop said movement in an intermediate position, said switching means being operable by said movement to said intermediate position to establish said series connection for low torque, and means operable by a slight reverse movement of said grip to render said stop means ineffective and enable further movement of said grip to a limiting position, said switching means being operable by said further movement to establish said parallel connection for high torque, said grip being free at all times for reverse movement to said off position without interference by said stop means.

RALPH M. HEINTZ.